United States Patent
Fan et al.

(10) Patent No.: US 11,418,567 B2
(45) Date of Patent: Aug. 16, 2022

(54) MEDIA DATA TRANSMISSION METHOD, CLIENT, AND SERVER

(71) Applicant: HUAWEI TECHNOLOGIES CO., LTD., Guangdong (CN)

(72) Inventors: Yuqun Fan, Shenzhen (CN); Peiyun Di, Shenzhen (CN); Ye-Kui Wang, Santa Clara, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/213,736

(22) Filed: Mar. 26, 2021

(65) Prior Publication Data
US 2021/0218792 A1 Jul. 15, 2021

Related U.S. Application Data

(63) Continuation of application No. PCT/CN2019/108761, filed on Sep. 27, 2019.

(30) Foreign Application Priority Data

Sep. 28, 2018 (CN) .......................... 201811142720.6

(51) Int. Cl.
*H04L 65/80* (2022.01)
*H04L 65/1059* (2022.01)
*H04L 65/60* (2022.01)

(52) U.S. Cl.
CPC .......... *H04L 65/80* (2013.01); *H04L 65/1059* (2013.01); *H04L 65/602* (2013.01)

(58) Field of Classification Search
CPC ... H04L 65/80; H04L 65/1059; H04L 65/602; H04L 65/608; H04L 65/604; H04L 29/06; H04L 65/60; H04N 13/194
See application file for complete search history.

(56) References Cited

U.S. PATENT DOCUMENTS 7,719,563 B2  5/2010 Richards
9,184,925 B1 * 11/2015 Wise .................. H04L 67/1095
(Continued)

FOREIGN PATENT DOCUMENTS

CN  102469072 A  5/2012
CN  103621074 A  3/2014
(Continued)

OTHER PUBLICATIONS

ISO/IEC JTC1/SC29/WG11/M42923-v1, Ye-Kui Wang et al., [OMAF] Editors Input Text for OMAF WD Based on Finland AHG Agreements, International Organisation for Standardisation Organisation Internationale De Normalisation ISO/IEC JTC1/SC29/WG11 Coding of Moving Pictures and Audio, OMAF v2 Editors, Jul. 2018, Ljubljana, Slovenia, total 203 pages. XP030195557.

*Primary Examiner* — Javier O Guzman
(74) *Attorney, Agent, or Firm* — Womble Bond Dickinson (US) LLP

(57) ABSTRACT

This application provides a media data transmission method and apparatus. The method includes: receiving, by a client, a media presentation description (MPD) file, where the MPD file includes priority indication information, and the priority indication information is used to indicate a priority or priorities of one or more overlays; and processing, by the client, the one or more overlays based on the priority indication information.

18 Claims, 5 Drawing Sheets

(56) References Cited

U.S. PATENT DOCUMENTS

| | | | |
|---|---|---|---|
| 2012/0042090 A1* | 2/2012 | Chen | H04N 21/8455 709/231 |
| 2012/0259994 A1* | 10/2012 | Gillies | H04L 12/1881 709/231 |
| 2013/0060956 A1* | 3/2013 | Nagaraj | H04L 65/607 709/231 |
| 2014/0375764 A1* | 12/2014 | Choe | H04N 13/161 348/43 |
| 2015/0032901 A1* | 1/2015 | Wang | H04L 65/4084 709/231 |
| 2015/0146787 A1 | 5/2015 | Hendry et al. | |
| 2015/0163564 A1* | 6/2015 | Degolyer | H04N 21/44016 725/32 |
| 2016/0006782 A1 | 1/2016 | Wang et al. | |
| 2016/0011923 A1* | 1/2016 | Walker | H04N 21/45457 714/49 |
| 2016/0134677 A1* | 5/2016 | Mueller | H04L 65/602 709/219 |
| 2017/0094288 A1* | 3/2017 | Hannuksela | H04N 19/187 |
| 2017/0127152 A1* | 5/2017 | Hirabayashi | H04N 19/17 |
| 2018/0175955 A1* | 6/2018 | Kitazato | H04H 60/13 |
| 2018/0278970 A1* | 9/2018 | So | H04N 21/4343 |
| 2019/0379876 A1* | 12/2019 | Hur | H04N 21/4884 |
| 2019/0379884 A1* | 12/2019 | Oh | H04N 19/167 |
| 2020/0014906 A1* | 1/2020 | Wang | G06V 20/46 |
| 2021/0201855 A1* | 7/2021 | Kammachi-Sreedhar | H04N 21/4728 |

FOREIGN PATENT DOCUMENTS

| | | |
|---|---|---|
| CN | 106688219 A | 5/2017 |
| CN | 107251521 A | 10/2017 |
| CN | 108370450 A | 8/2018 |
| CN | 108574881 A | 9/2018 |
| CN | 111133763 A | 5/2020 |
| WO | 2017142353 A1 | 8/2017 |
| WO | 2017203098 A1 | 11/2017 |
| WO | 2017205794 A1 | 11/2017 |

* cited by examiner

MEDIA DATA TRANSMISSION METHOD, CLIENT, AND SERVER

CROSS-REFERENCE TO RELATED APPLICATIONS

This application is a continuation of International Application No. PCT/CN2019/108761, filed on Sep. 27, 2019, which claims priority to Chinese Patent Application No. 201811142720.6, filed on Sep. 28, 2018. The disclosures of the aforementioned applications are hereby incorporated by reference in their entireties.

TECHNICAL FIELD

This application relates to the field of streaming media transmission technologies, and more particularly, to a media data transmission method, a client, and a server.

BACKGROUND

The ISO/IEC 23090-2 standard specification is also referred to as the OMAF (omnidirectional media format, omnidirectional media format) standard specification. The specification defines a media application format, and the media application format can implement presentation of omnidirectional media in an application. The omnidirectional media mainly refers to an omnidirectional video (a 360-degree video) and associated audio. In the OMAF specification, a list of projection methods that can be used to convert a spherical video into a two-dimensional (2D) video is first specified. Further, how to store, in an ISO base media file format (ISOBMFF), omnidirectional media and metadata associated with the media is specified. Also specified are how to encapsulate omnidirectional media data in a streaming media system and how to transmit the omnidirectional media data by using transmission methods such as dynamic adaptive streaming over hypertext transfer protocol (HTTP) (DASH) transmission and dynamic adaptive streaming transmission that is specified in the ISO/IEC 23009-1 standard. The DASH defines a media presentation description (media presentation description, MPD) file format and a segment format.

An omnidirectional video includes a series of panoramic images. Content in the panoramic images covers an entire sphere surface in a three-dimensional space. The omnidirectional video may include a background video image and an overlay. Currently, a client cannot select a part of overlays for processing.

SUMMARY

This application provides a media data transmission method, a client, and a server, to signal an overlay priority in a DASH MPD file, so that the client can select and process an overlay in an overlay priority order.

This application further provides a media data transmission method, a client, and a server, to signal an overlay decoding capability requirement in a DASH MPD file, so that the client can select and process an overlay based on the overlay decoding capability requirement and a decoding capability of the client.

According to a first aspect, a media data transmission method is provided. The method includes: A client receives a media presentation description MPD file. The MPD file includes priority indication information, and the priority indication information is used to indicate a priority or priorities of one or more overlays. The client processes the one or more overlays based on the priority indication information. In the method, the MPD file includes the priority indication information, and the client can select, based on the priority indication information of the overlay, an overlay that is to be preferentially processed.

In an embodiment, the method further includes: The client obtains the one or more overlays based on the MPD file.

In an embodiment, that the client processes the one or more overlays based on the priority indication information includes: when a processing resource of the client is insufficient, processing, based on a quantity of overlays that can be processed by using the processing resource of the client, the quantity of overlays in descending order of the priority or priorities of the one or more overlays.

In an embodiment, the client obtains, in descending order of the priority or priorities of the one or more overlays based on the MPD file and the quantity of overlays that can be processed by using the processing resource of the client, bitstream data of the quantity of overlays that can be processed, for processing.

In an embodiment, the client obtains the one or more overlays based on the MPD file, and selects and decodes, in descending order of the priority or priorities of the one or more overlays based on the quantity of overlays that can be processed by using the processing resource of the client, bitstream data of the quantity of overlays that can be processed.

In an embodiment, the client obtains the one or more overlays based on the MPD file, and selects and displays, in descending order of the priority or priorities of the one or more overlays based on the quantity of overlays that can be processed by using the processing resource of the client, the quantity of overlays that can be processed.

In an embodiment, the priority indication information is attribute information of an overlay descriptor in the MPD file.

In an embodiment, the attribute information of the overlay descriptor further includes an identifier or identifiers of the one or more overlays.

In an embodiment, in the priority indication information, a smaller value of a priority of any overlay indicates a higher priority of the overlay.

In another embodiment, in the priority indication information, a larger value of a priority of any overlay indicates a higher priority of the overlay.

In an embodiment, the priority indication information includes one priority value, and the one priority value is used to indicate the priority or priorities of the one or more overlays.

In an embodiment, the one or more overlays are M overlays, the priority indication information includes M priority values, the M priority values are used to indicate priorities of the M overlays, and M is a positive integer.

In an embodiment, an $n^{th}$ value in the M priority values is used to indicate a priority of an $n^{th}$ overlay in the M overlays, and n is a positive integer less than or equal to M.

In an embodiment, the overlay descriptor is located in an adaptation set of the MPD file.

In an embodiment, the MPD file includes overlay descriptors of M overlays, where an overlay descriptor or overlay descriptors of one or more of the M overlays includes or include the priority indication information, and M is greater than or equal to 1. In this manner, some overlay descriptors do not carry the priority indication information.

According to a second aspect, a media data transmission method is provided. The method includes: A server determines a priority or priorities of one or more overlays; and sends a media presentation description MPD file. The MPD file includes priority indication information, and the priority indication information is used to indicate the priority or priorities of the one or more overlays.

It should be understood that, limitations and explanations of corresponding content of the priority indication information of the overlay in the first aspect are also applicable to implementations in the second aspect. Details are not described herein again.

According to a third aspect, a media data transmission method is provided. The method includes: A client receives a media presentation description MPD file. The MPD file includes decoding capability requirement indication information of an overlay, and the decoding capability requirement indication information is used to indicate a requirement on a decoding capability required for decoding the overlay. The client processes the overlay based on the decoding capability requirement indication information of the overlay. In this method, an overlay decoding capability requirement can be signaled in a DASH MPD file, so that the client can select and process an overlay based on the overlay decoding capability requirement and a decoding capability of the client.

The required decoding capability includes an image resolution that needs to be supported.

In an embodiment, the decoding capability requirement indication information includes decoding capability width requirement indication information and decoding capability height requirement indication information; the decoding capability width requirement indication information is used to indicate a width of the image resolution that needs to be supported to decode the overlay, and the decoding capability height requirement indication information is used to indicate a height of the image resolution that needs to be supported to decode the overlay; and the image resolution that needs to be supported is a product of the width of the image resolution that needs to be supported and the height of the image resolution that needs to be supported.

In an embodiment, the decoding capability requirement indication information of the overlay is attribute information of an overlay descriptor of the overlay in the MPD file.

In an embodiment, the attribute information of the overlay descriptor further includes an identifier of the overlay.

In an embodiment, the overlay descriptor is located in an adaptation set of the MPD file.

In an embodiment, the overlay includes one or more overlays. That the client processes the overlay based on the decoding capability requirement indication information of the overlay includes: The client processes the overlay if the decoding capability of the client is greater than a sum of a decoding capability requirement or decoding capability requirements indicated by decoding capability requirement indication information of the one or more overlays.

In an embodiment, the MPD file includes priority indication information, and the priority indication information is used to indicate a priority or priorities of the one or more overlays. That the client processes the overlay based on the decoding capability requirement indication information of the overlay includes: If the decoding capability of the client is less than the sum of the decoding capability requirement or decoding capability requirements indicated by the decoding capability requirement indication information of the one or more overlays, the client selects, based on the priority or priorities of the one or more overlays, an overlay that is to be preferentially processed, for processing. The decoding capability of the client is greater than or equal to a sum of a decoding capability requirement indicated by decoding capability requirement indication information of the overlay that is to be preferentially processed.

In an embodiment, the MPD file includes overlay descriptors of M overlays, where an overlay descriptor or overlay descriptors of one or more of the M overlays includes or include decoding capability requirement indication information, and M is greater than or equal to 1. In this manner, some overlay descriptors do not carry decoding capability requirement indication information.

According to a fourth aspect, a media data transmission method is provided. The method includes: A server determines a decoding capability requirement of an overlay; and sends a media presentation description MPD file. The MPD file includes decoding capability requirement indication information of the overlay, and the decoding capability requirement indication information is used to indicate a requirement on a decoding capability required for decoding the overlay. In this method, an overlay decoding capability requirement can be signaled in a DASH MPD file, so that a client can select and process an overlay based on the overlay decoding capability requirement and a decoding capability of the client.

The required decoding capability includes an image resolution that needs to be supported.

It should be understood that, limitations and explanations of corresponding content of the decoding capability requirement indication information in the third aspect are also applicable to implementations in the fourth aspect. Details are not described herein again.

According to a fifth aspect, a client is provided. The client includes a module configured to perform the method according to any one of the implementations in the first aspect or the third aspect.

According to a sixth aspect, a server is provided. The server includes a module configured to perform the method according to any one of the implementations in the second aspect or the fourth aspect.

According to a seventh aspect, a client is provided. The client includes a non-volatile memory and a processor that are coupled to each other, where the processor is configured to invoke program code stored in the memory, to perform a part of or all operations of the method according to any one of the implementations in the first aspect or the third aspect.

According to an eighth aspect, a server is provided. The server includes a non-volatile memory and a processor that are coupled to each other, where the processor is configured to invoke program code stored in the memory, to perform a part of or all operations of the method according to any one of the implementations in the second aspect or the fourth aspect.

According to a ninth aspect, a computer-readable storage medium is provided. The computer-readable storage medium stores program code, and the program code includes instructions used to perform a part of or all operations of the method according to any one of the implementations in the first aspect, the second aspect, the third aspect, or the fourth aspect.

According to a tenth aspect, a computer program product is provided. When the computer program product is run on a computer, the computer is enabled to execute instructions used to perform a part of or all operations of the method according to any one of the implementations in the first aspect, the second aspect, the third aspect, or the fourth aspect.

DESCRIPTION OF EMBODIMENTS

The following describes technical solutions in this application with reference to the accompanying drawings.

Figure 1:
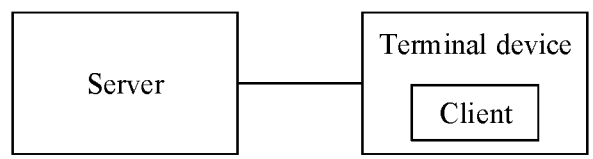
FIG. 1 is a schematic diagram 1 of a system framework to which an embodiment of this application is applicable.

The technical solutions provided in this application may be applied to a system architecture shown in FIG. 1. The system architecture may include a server and one or more terminal devices connected to the server. The server is configured to provide a media data service for the terminal device. For example, the server may select, based on information (for example, a user's viewport) fed back by a client, content that needs to be transmitted, and transmit a signal to the terminal device. The terminal device may be a device that has a function of playing a panoramic video, for example, an electronic device that can be connected to a network, such as a virtual reality (VR) device, a mobile phone, a tablet computer, a television, or a computer. The client runs on the terminal device, and the client may be a program that is located on the terminal device and that provides a panoramic video playing service for a user.

It should be noted that the system architecture shown in FIG. 1 is merely used as an example, but is not intended to limit the technical solutions in this application. A person skilled in the art should understand that, in a specific implementation process, the system architecture may further include another device, for example, the system architecture may include a content delivery network device between the server and the terminal device.

Figure 2:
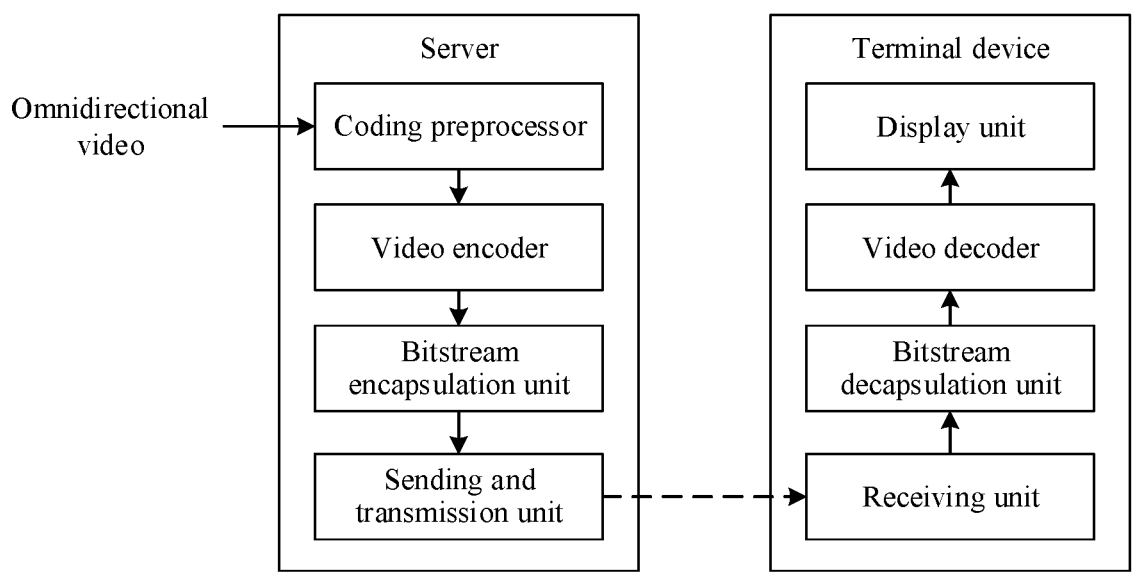
FIG. 2 is a schematic diagram 2 of a system framework to which an embodiment of this application is applicable.

In an example, the system architecture shown in FIG. 1 may be in a form shown in FIG. 2. The server includes a coding preprocessor, a video encoder, a bitstream encapsulation unit, and a sending and transmission unit. The server receives an omnidirectional video; pre-processes, encodes, or transcodes the omnidirectional video; encapsulates encoded stream data into a file that meets a transmission format; and sends the file by using the sending and transmission unit. Media data is transmitted to the terminal device or a content delivery network through a network. The terminal device includes a receiving unit, a bitstream decapsulation unit, a video decoder, and a display unit. The terminal device receives media data sent by the server, and performs bitstream decapsulation, decoding, and display. In addition, the server may further select, based on information (for example, a user's viewport) fed back by the terminal device, media data content that is to be transmitted.

The following explains and describes some terms in this application.

1. Overlay

An omnidirectional video may include a background video image and an overlay. The overlay is an additional layer of video, image, or text that is superimposed and rendered on a region of the background video image.

2. MPD File

An MPD file is a file defined in the omnidirectional media data transmission protocol DASH specified in the ISO/IEC 23009-1 standard. The MPD file includes metadata for constructing an HTTP uniform resource locator (HTTP-URL) by a client. The MPD file includes one or more period elements. Each period element includes one or more adaptation sets. Each adaptation set includes one or more representations. Each representation includes one or more segments. The client may select a representation based on information in the MPD file, and construct an HTTP-URL of a segment.

3. The term "a plurality of" in this specification means two or more. The terms "first" and "second" in this specification are intended to distinguish between different objects, but do not indicate a particular order of the objects. The term "and/or" in this specification describes only an association relationship for describing associated objects and represents that three relationships may exist. For example, A and/or B may represent the following three cases: Only A exists, both A and B exist, and only B exists.

In the embodiments of this application, the word such as "in an example" or "for example" is used to represent giving an example, an illustration, or a description. Any embodiment or design scheme described as "in an example" or "for example" in the embodiments of this application should not be explained as having more advantages than another embodiment or design scheme. Exactly, use of the word such as "in an example" or "for example" is intended to present a relative concept in a specific manner.

Figure 3:
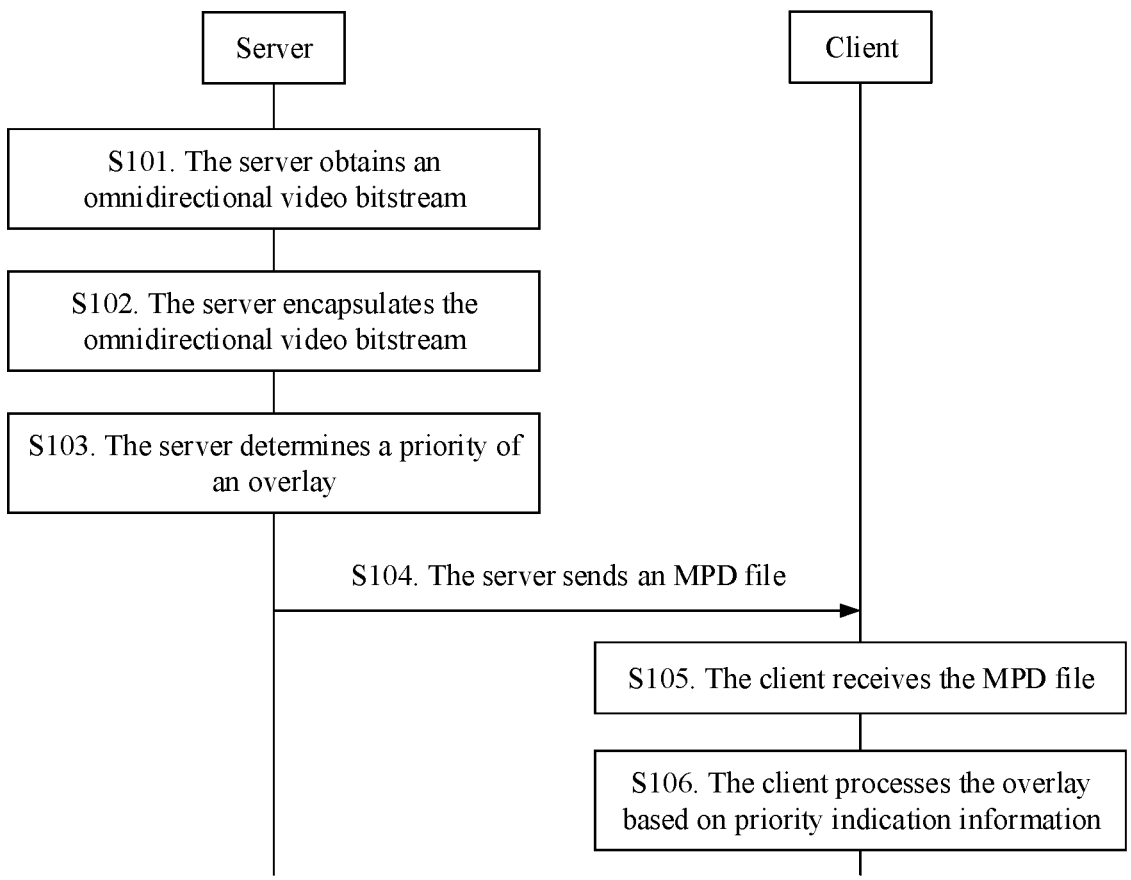
FIG. 3 is a schematic flowchart 1 of a media data transmission method according to an embodiment of this application.

An embodiment of this application provides a media data transmission method, applied to the system architecture shown in FIG. 1 or FIG. 2. As shown in FIG. 3, the method may include S101 to S106.

S101. A server obtains an omnidirectional video bitstream.

The server obtains the omnidirectional video bitstream, where the omnidirectional video bitstream includes a background video bitstream and an overlay bitstream. One overlay bitstream corresponds to one overlay. The overlay bitstream may be a separate bitstream, or may be a part of the background video bitstream. For example, the server may obtain the omnidirectional video bitstream from a video service providing device.

S102. The server encapsulates the omnidirectional video bitstream.

The server encapsulates the omnidirectional video bitstream in a video file format. For example, encapsulation is performed in an ISO base media file format.

In an embodiment, the server may encapsulate the omnidirectional video bitstream as a whole into an omnidirectional video bitstream packet. In another embodiment, the server may encapsulate the background video bitstream into a background video bitstream packet, and encapsulate one or more overlay bitstreams into one or more overlay bitstream packets, where one overlay bitstream packet corresponds to one overlay.

In an embodiment, the bitstream encapsulation unit of the server shown in FIG. 2 may encapsulate the omnidirectional video bitstream.

S103. The server determines a priority of the overlay.

The server determines a priority of each overlay. For example, the server may determine the priority of each overlay based on an indication of the video service providing device. For example, the server may alternatively determine the priority of each overlay based on content of the overlay. For example, content of an overlay 1 is a supplement to content of a background video, and helps a viewer understand a story of the background video. Content of an overlay 2 is unrelated to the content of the background video, for example, an advertisement. In this case, the server may set a priority of the overlay 1 to be higher than a priority of the overlay 2.

The server generates priority indication information based on the priority of each overlay. Each piece of priority indication information is used to indicate a priority or priorities of one or more overlays.

The server writes the priority indication information of each overlay into a DASH MPD file.

In an embodiment, the priority indication information is attribute information of an overlay descriptor in the DASH MPD file. Particularly, a format of the overlay in the DASH MPD file is defined in the OMAF standard. For example, an overlay descriptor (overlay descriptor) is defined in an MPD file in the OMAF standard, and the overlay descriptor includes various types of attribute information used to describe content related to the overlay. For example, @schemeIdUri of the overlay descriptor is "urn:mpeg:mpegI:omaf:2018:ovly". One adaptation set (adaptation set) in the DASH MPD file includes at most one overlay descriptor, and the overlay descriptor is used to describe an overlay associated with the adaptation set. If there is no overlay associated with the adaptation set, the adaptation set (adaptation set) does not include an overlay descriptor.

In an embodiment, the attribute information of the overlay descriptor may further include an identifier of the overlay.

For example, a format definition of an overlay descriptor is shown in Table 1.

TABLE 1

| Overlay descriptor | Rule | Data type | Description |
| --- | --- | --- | --- |
| value | M | Unsigned integer set | Identifiers of whitespace-separated overlays |
| priority | 0 . . . 1 | Integer | Overlay priority |

The term "value" represents an identifier of an overlay, and indicates an identifier or identifiers of one or more overlays. The term "priority" represents priority indication information. Rule M indicates that the attribute must be present, and rule 0 . . 1 indicates that the attribute is not present or only one attribute is present. When there are a plurality of overlays, "priority" indicates that priorities of the plurality of overlays corresponding to the overlay descriptor all have the priority value.

For another example, a format definition of an overlay descriptor is shown in Table 2.

TABLE 2

| Overlay descriptor | Rule | Data type | Description |
| --- | --- | --- | --- |
| value | M | Unsigned integer set | Identifiers of whitespace-separated overlays |
| priority | 0 . . . 1 | Unsigned integer set | Priorities of whitespace-separated overlays |

The term "value" represents an identifier of an overlay, and indicates an identifier or identifiers of one or more overlays. The term "priority" represents priority indication information, and indicates a priority or priorities of one or more overlays, and a quantity and an order of the priorities are the same as a quantity and an order of overlays in the "value", where an $n^{th}$ value in the priority indication information indicates a priority of an overlay indicated by an $n^{th}$ identifier in the "value", and n is a positive integer. Rule M indicates that the attribute must be present, and rule 0 . . 1 indicates that the attribute is not present or only one attribute is present.

For another example, a format definition of an overlay descriptor is shown in Table 3.

TABLE 3

| Overlay descriptor | Rule | Data type | Description |
| --- | --- | --- | --- |
| value | M | Unsigned integer set | Identifiers of whitespace-separated overlays |
| OvelayInfo | 1 | Overlay information type | Container element whose sub-element or attribute provides overlay information |
| OvelayInfo @ priority | 0 . . . 1 | Integer | Overlay priority |

The term "value" represents an identifier of an overlay, and indicates an identifier or identifiers of one or more overlays. OvelayInfo represents overlay information, and "priority" represents priority indication information. When there are a plurality of overlays, "priority" indicates that priorities of the plurality of overlays corresponding to the overlay descriptor all have the priority value. Rule M indicates that the attribute must be present, rule 1 indicates that only one attribute is present, and rule 0 . . 1 indicates that the attribute is not present or only one attribute is present.

For another example, a format definition of an overlay descriptor is shown in Table 4.

TABLE 4

| Overlay descriptor | Rule | Data type | Description |
| --- | --- | --- | --- |
| value | M | Unsigned integer set | Identifiers of whitespace-separated overlays |
| OvelayInfo | 1 | Overlay information type | Container element whose sub-element or attribute provides overlay information |
| OvelayInfo @ priority | 0 . . . 1 | Unsigned integer set | Priorities of whitespace-separated overlays |

The term "value" represents an identifier of an overlay, and indicates an identifier or identifiers of one or more overlays. OvelayInfo represents overlay information. The term "priority" represents priority indication information, and indicates a priority or priorities of one or more overlays, and a quantity and an order of the priorities are the same as a quantity and an order of overlays in the "value", where an $n^{th}$ value in the priority indication information indicates a priority of an overlay indicated by an $n^{th}$ identifier in the "value", and n is a positive integer. Rule M indicates that the attribute must be present, rule 1 indicates that only one attribute is present, and rule 0 . . 1 indicates that the attribute is not present or only one attribute is present.

It should be noted that the priority indication information attribute may not be present, in other words, the server may not fill priorities of some overlays. If the MPD file includes overlay descriptors of M overlays, an overlay descriptor or overlay descriptors of one or more of the M overlays includes or include the priority indication information, where M is greater than or equal to 1.

In an embodiment, in the priority indication information, a smaller value of a priority of any overlay indicates a higher priority of the any overlay. For example, if a value of the priority of the overlay 1 is 1, and a value of the priority of the overlay 2 is 2, the priority of the overlay 1 is higher than the priority of the overlay 2.

In an embodiment, in the priority indication information, a larger value of a priority of any overlay indicates a higher priority of the any overlay. For example, if a value of the priority of the overlay 1 is 1, and a value of the priority of the overlay 2 is 2, the priority of the overlay 2 is higher than the priority of the overlay 1.

For example, priority indication information in an MPD file may be represented in the following form:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <AdaptationSet   segmentAlignment="true"   subsegmentAlignment="true" subsegmentStartsWithSAP="1">
      <SupplementalProperty   schemeIdUri="   urn:mpeg:mpegI:omaf:2018:ovly" value="1">
        <omaf:OvelayInfo priority="1" />
      </SupplementalProperty>
      <Representation mimeType="video/mp4" codecs="avc1.42c00d" width="960" height="1080" bandwidth="79707" startWithSAP="1">
        <BaseURL> overlay1.mp4</BaseURL>
        <SegmentBase indexRangeExact="true" indexRange="837-988"/>
      </Representation>
    </AdaptationSet>
    <AdaptationSet   segmentAlignment="true"   subsegmentAlignment="true" subsegmentStartsWithSAP="1" >
      <SupplementalProperty   schemeIdUri="   urn:mpeg:mpegI:omaf:2018:ovly" value="2">
        <omaf:OvelayInfo priority="2" />
      </SupplementalProperty>
      <Representation mimeType="video/mp4" codecs="avc1.42c00d" width="960" height="1080" bandwidth="79707" startWithSAP="1">
        <BaseURL> overlay2.mp4</BaseURL>
        <SegmentBase indexRangeExact="true" indexRange="837-988"/>
      </Representation>
    </AdaptationSet>
  </Period>
</MPD>
```

As shown above, in an adaptation set (AdaptationSet) of the DASH MPD, two overlays are separately described by using an overlay descriptor. An identifier value of one overlay is 1, and a priority value of the overlay is 1; and an identifier value of the other overlay is 2, and a priority value of the other overlay is 2.

For another example, priority indication information in an MPD file may be represented in the following form:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <AdaptationSet   segmentAlignment="true"   subsegmentAlignment="true" subsegmentStartsWithSAP="1" >
      <SupplementalProperty   schemeIdUri="   urn:mpeg:mpegI:omaf:2018:ovly" value="1 2" >
        <omaf:OvelayInfo priority="1 2" />
      </SupplementalProperty>
      <Representation mimeType="video/mp4" codecs="avc1.42c00d" width"960"
```

```
            height="1080" bandwidth="79707" startWithSAP="1">
                    <BaseURL> overlay1.mp4</BaseURL>
                    <SegmentBase indexRangeExact="true" indexRange="837-988"/>
                </Representation>
                <Representation mimeType="video/mp4" codecs="avc1.42c00d" width"960"
            height="1080" bandwidth="79707" startWithSAP="1">
                    <BaseURL> overlay2.mp4</BaseURL>
                    <SegmentBase indexRangeExact="true" indexRange="837-988"/>
                </Representation>
            </AdaptationSet>
        </Period>
    </MPD>
```

As shown above, in an adaptation set (AdaptationSet) of the DASH MPD, two overlays are described by using an overlay descriptor. An identifier value of one overlay is 1, and a priority value of the overlay is 1; and an identifier value of the other overlay is 2, and a priority value of the other overlay is 2.

S104. The server sends the MPD file.

The server sends the MPD file, where the MPD file includes the priority indication information. For example, the sending and transmission unit of the server shown in FIG. 2 sends the MPD file.

S105. A client receives the MPD file.

The client receives the MPD file, where the MPD file includes the priority indication information. The client obtains the priority or priorities of the one or more overlays.

S106. The client processes the overlay based on the priority indication information.

The client obtains bitstream data of the overlay. For example, the bitstream data of the overlay may be an overlay bitstream packet sent by the server. The bitstream data of the overlay may alternatively be a part of bitstream data in a background video bitstream packet sent by the server.

In an embodiment, after receiving the MPD file, the client may obtain bitstream data of the one or more overlays based on the MPD file.

In an embodiment, when a processing resource of the client is insufficient, for example, a resource of a video decoder, a central processing unit (CPU), or a graphics processing unit (GPU) of the client is insufficient, the client may process, in descending order of the priority or priorities of the one or more overlays based on a quantity of overlays that can be processed by using the processing resource of the client, the quantity of overlays that can be processed. For example, the processing resource of the client is insufficient, only one overlay can be processed, a value of the priority of the overlay 1 is 1, a value of the priority of the overlay 2 is 2, and the priority of the overlay 1 is higher than the priority of the overlay 2. In this case, the client displays the overlay 1 on a background video image.

In an embodiment, the client determines, based on the identifier of the overlay in the MPD file, overlays that can be provided by the server. In an embodiment, the client selects, in descending order of the priority or priorities of the one or more overlays based on the quantity of overlays that can be processed by using the processing resource of the client, the quantity of overlays that can be processed by the client from the overlays that can be provided by the server; and requests and obtains bitstream data of the selected overlay from the server. The server sends the overlay requested by the client to the client. After obtaining requested bitstream data of one or more overlays, the client decodes the bitstream data of the one or more overlays, and displays the corresponding overlay on the background video image.

In an embodiment, the client determines, based on the identifier of the overlay in the MPD file, overlays that can be provided by the server, and requests and obtains bitstream data of these overlays from the server. The server sends the overlays requested by the client to the client. After receiving the bitstream data of the overlays, the client selects and decodes, in descending order of the priority or priorities of the one or more overlays based on the quantity of overlays that can be processed by using the processing resource of the client, bitstream data of the quantity of overlays that can be processed by the client; and displays a decoded overlay on the background video image.

In an embodiment, the client determines, based on the identifier of the overlay in the MPD file, overlays that can be provided by the server, and requests and obtains bitstream data of these overlays from the server. The server sends the overlays requested by the client to the client. After receiving the bitstream data of the overlays, the client decodes the received bitstream data of the overlays; selects, in descending order of the priority or priorities of the one or more overlays based on the quantity of overlays that can be processed by using the processing resource of the client, the quantity of overlays that can be processed by the client; and displays the overlay on the background video image.

It should be noted that the priority indication information may not be present in the MPD file. In an embodiment, for an overlay whose priority indication information is not obtained, if the overlay is essential (for example, is represented as EssentialProperty in the MPD file), the overlay must be processed, and the client processes the overlay without considering a priority of the overlay. If the overlay is supplemental (for example, is represented as SupplementalProperty in the MPD file), the overlay is optionally processed, and the client determines that a priority of the overlay is lower than a priority of an overlay whose priority indication information is obtained.

Currently, in the ISOBMFF specified in the OMAF standard, a basic data structure and a carrying manner of the overlay are defined, where a parameter for defining an overlay priority is included. However, in a protocol DASH MPD file for transmitting omnidirectional media data, a parameter that can indicate an overlay priority is not defined, and the client cannot perform overlay selection processing based on a priority of an overlay. According to the media data transmission method provided in this embodiment of this application, the DASH MPD file includes the priority indication information of the overlay, and the client can select, based on a priority that is of the overlay and that is indicated by the priority indication information, an overlay that is to be processed.

Figure 4:
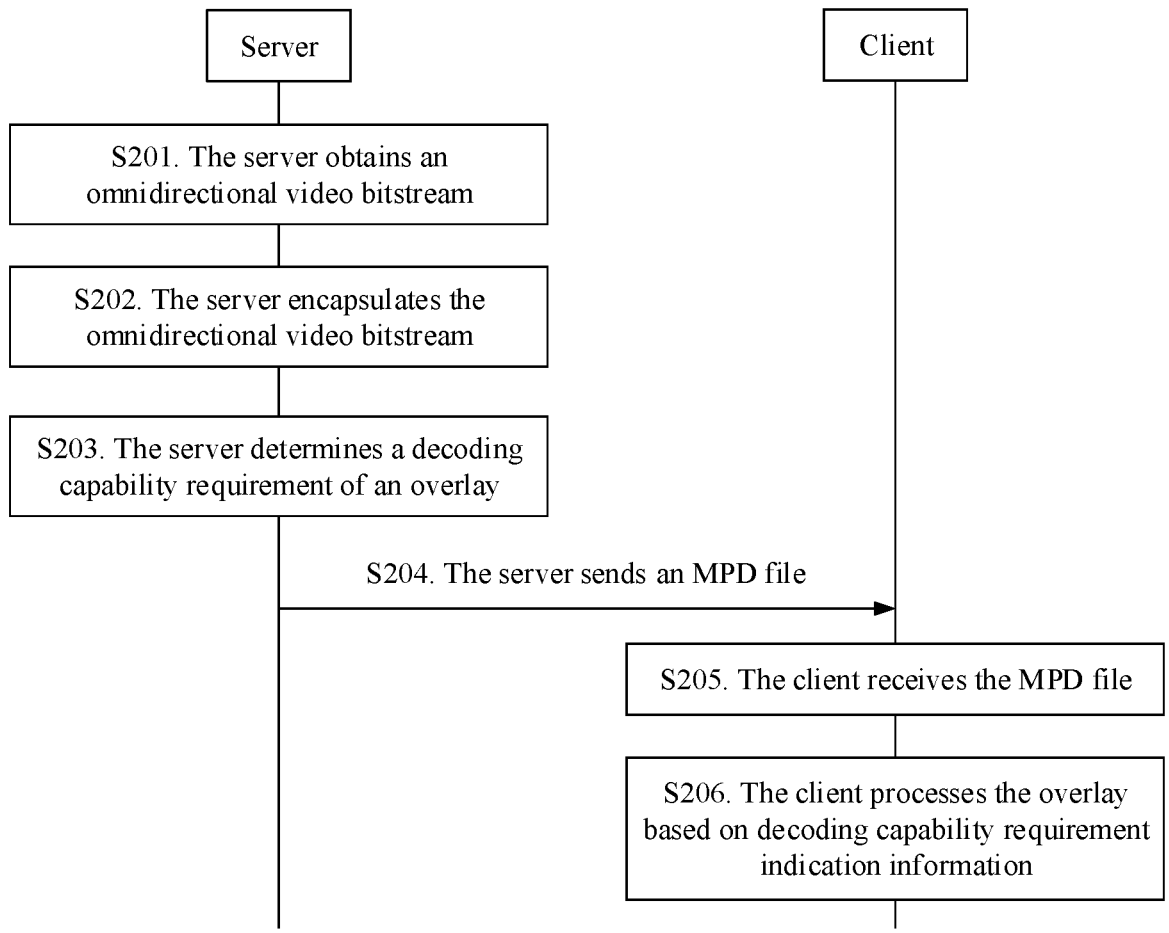
FIG. 4 is a schematic flowchart 2 of a media data transmission method according to an embodiment of this application.

An embodiment of this application provides a media data transmission method, applied to the system architecture shown in FIG. 1 or FIG. 2. As shown in FIG. 4, the method may include S201 to S206.

S201. A server obtains an omnidirectional video bitstream.

For a specific description of S201, refer to S101. Details are not described herein again.

S202. The server encapsulates the omnidirectional video bitstream.

For a specific description of S202, refer to S102. Details are not described herein again.

S203. The server determines a decoding capability requirement of an overlay.

The server determines a decoding capability requirement of each overlay. For example, the server may determine the decoding capability requirement of each overlay based on an indication of a video service providing device. For example, the server may alternatively determine the decoding capability requirement of each overlay based on content of the overlay (for example, a resolution of the overlay).

The decoding capability requirement of the overlay includes an image resolution that needs to be supported to decode the overlay. For example, if an overlay needs to be decoded and a bitstream resolution of the overlay is 1920×1080, a decoding capability requirement of the overlay is 1920×1080.

The server generates decoding capability requirement indication information based on the decoding capability requirement of each overlay. The decoding capability requirement indication information is used to indicate a requirement on a decoding capability required for decoding the overlay. One piece of decoding capability requirement indication information includes one piece of decoding capability width requirement indication information and one piece of decoding capability height requirement indication information. The decoding capability width requirement indication information is used to indicate the width of the image resolution that needs to be supported to decode the overlay, and the decoding capability height requirement indication information is used to indicate the height of the image resolution that needs to be supported to decode the overlay. The image resolution that needs to be supported is a product of the width of the image resolution that needs to be supported and the height of the image resolution that needs to be supported.

The server writes the decoding capability requirement indication information of each overlay into a DASH MPD file.

In an embodiment, the decoding capability requirement indication information is attribute information of an overlay descriptor of an overlay in the DASH MPD file. Particularly, a format of the overlay in the DASH MPD file is defined in the OMAF standard. For example, an overlay descriptor (overlay descriptor) is defined in an MPD file in the OMAF standard, and the overlay descriptor includes various types of attribute information used to describe content related to the overlay. For example, @schemeIdUri of the overlay descriptor is "urn:mpeg:mpegI:omaf:2018:ovly". One adaptation set (adaptation set) in the DASH MPD file may include at most one overlay descriptor, and the overlay descriptor is used to describe an overlay associated with the adaptation set. If there is no overlay associated with the adaptation set, the adaptation set (adaptation set) does not include an overlay descriptor.

In an embodiment, the attribute information of the overlay descriptor may further include an identifier of the overlay.

For example, a format definition of an overlay descriptor is shown in Table 5.

TABLE 5

| Overlay descriptor | Rule | Data type | Description |
| --- | --- | --- | --- |
| value | M | Unsigned integer set | Identifier of an overlay |
| decoding_width | 0 . . . 1 | Integer | Indicates the width of an image resolution required for decoding the overlay. |
| decoding_height | 0 . . . 1 | Integer | Indicates the width of the image resolution required for decoding the overlay. |

The term "value" represents an identifier of an overlay, decoding_width represents decoding capability width requirement indication information, and decoding_height represents decoding capability height requirement indication information. Rule M indicates that the attribute must be present, and rule 0 . . 1 indicates that the attribute is not present or only one attribute is present.

For another example, a format definition of an overlay descriptor is shown in Table 6.

TABLE 6

| Overlay descriptor | Rule | Data type | Description |
| --- | --- | --- | --- |
| value | M | Unsigned integer set | Identifier of an overlay |
| OvelayInfo | 1 | Overlay information type | Container element whose sub-element or attribute provides overlay information |
| OvelayInfo @ decoding_width | 0 . . . 1 | Integer | Indicates the width of an image resolution required for decoding the overlay. |
| OvelayInfo @ decoding_height | 0 . . . 1 | Integer | Indicates the height of the image resolution required for decoding the overlay. |

The term "value" represents an identifier of an overlay, OvelayInfo represents overlay information, decoding_width represents decoding capability width requirement indication information, and decoding_height represents decoding capability height requirement indication information. Rule M indicates that the attribute must be present, rule 1 indicates that only one attribute is present, and rule 0 . . 1 indicates that the attribute is not present or only one attribute is present.

It should be noted that the decoding capability requirement indication information attribute may not be present, in other words, the server may not fill decoding capability requirements of some overlays. If the MPD file includes overlay descriptors of M overlays, an overlay descriptor or overlay descriptors of one or more of the M overlays includes or include decoding capability requirement indication information, where M is greater than or equal to 1.

For example, decoding capability requirement indication information in an MPD file may be represented in the following form:

```
<?xml version="1.0" encoding="UTF-8"?>
<MPD
xmlns="urn:mpeg:dash:schema:mpd:2011"
```

```
                type="static"
                mediaPresentationDuration="PT0S1"
                minBufferTime="PT1S"
                profiles="urn:mpeg:dash:profile:isoff-on-demand:2011">
            <Period>
                <AdaptationSet    segmentAlignment="true"    subsegmentAlignment="true"
    subsegmentStartsWithSAP="1" >
                    <SupplementalProperty    schemeIdUri="    urn: mpeg:mpegI:omaf:2018:ovly"
    value="1" >
                        <omaf:OvelayInfo decoding_width="1920" decoding_height="1080" />
                    </SupplementalProperty>
                    <Representation mimeType="video/mp4" codecs="avc1.42c00d" width="960"
    height="1080" bandwidth="79707" startWithSAP="1">
                        <BaseURL> overlay.mp4</BaseURL>
                        <SegmentBase indexRangeExact="true" indexRange="837-988"/>
                    </Representation>
                </AdaptationSet>
            </Period>
        </MPD>
```

As shown above, in an adaptation set (AdaptationSet) of the DASH MPD, an overlay with an identifier value of 1 is described by using an overlay descriptor, and a decoding capability requirement of the overlay is 1920×1080.

S204. The server sends the MPD file.

The server sends the MPD file, where the MPD file includes the decoding capability requirement indication information of the overlay. For example, the sending and transmission unit of the server shown in FIG. 2 sends the MPD file.

S205. A client receives the MPD file.

The client receives the MPD file, where the MPD file includes the decoding capability requirement indication information of the overlay. The client obtains decoding capability requirement indication information of one or more overlays.

S206. The client processes the overlay based on the decoding capability requirement indication information.

In an embodiment, the client may obtain the one or more overlays based on the MPD file. For example, the client determines, based on the identifier of the overlay in the MPD file, overlays that can be provided by the server, and requests and obtains these overlays from the server. The server sends bitstream data of the overlays requested by the client to the client. For example, the bitstream data of the overlay may be an overlay bitstream packet sent by the server. The bitstream data of the overlay may alternatively be a part of bitstream data in a background video bitstream packet sent by the server.

The client processes the obtained one or more overlays based on the decoding capability requirement indication information of the one or more overlays in the MPD file.

In an embodiment, the client processes the overlay if a decoding capability of the client is greater than a sum of a decoding capability requirement or decoding capability requirements indicated by the decoding capability requirement indication information of the one or more overlays in the MPD file. For example, the decoding capability of the client is 4K. The MPD file includes decoding capability requirement indication information of two overlays, a decoding capability requirement of one overlay is 1K, and a decoding capability requirement of the other overlay is 2K. In this case, the client determines that the decoding capability of the client is greater than the decoding capability requirements of the two overlays, and the client can decode bitstream data of the two overlays.

It should be noted that, in the MPD file, the decoding capability requirement indication information may not be present, and the client may not consider the decoding capability requirement of the overlay.

Further, the client may select, based on a priority and a decoding capability requirement of an overlay, an overlay that is to be processed. In an embodiment, if the decoding capability of the client is less than the sum of the decoding capability requirement or decoding capability requirements indicated by the decoding capability requirement indication information of the one or more overlays in the MPD file, the client cannot decode the one or more overlays. For example, this is a case in which a processing resource of the client is insufficient. The client may select, based on a priority or priorities of the one or more overlays, an overlay that is to be preferentially processed, for processing, where the decoding capability of the client is greater than or equal to a sum of a decoding capability requirement indicated by decoding capability requirement indication information of the overlay that is to be preferentially processed. It should be noted that a sum of a decoding capability requirement indicated by decoding capability requirement indication information of one overlay is a decoding capability requirement indicated by the decoding capability requirement indication information of the one overlay. For example, the decoding capability of the client is 4K. The MPD file includes decoding capability requirement indication information of three overlays, a decoding capability requirement of an overlay 1 is 1K, a decoding capability requirement of an overlay 2 is 2K, and a decoding capability requirement of an overlay 3 is 2K. In this case, the client determines that the decoding capability of the client is less than a sum of the decoding capability requirements of the three overlays, and the client may select, based on priorities of the three overlays, an overlay that is to be preferentially processed. For example, a smaller value of a priority of an overlay indicates a higher priority of the overlay. If a value of the priority of the overlay 1 is 1, a value of the priority of the overlay 2 is 2, and a value of the priority of the overlay 3 is 1, the priorities of the overlay 1 and the overlay 3 are higher than the priority of the overlay 2. In this case, the client selects the overlay 1 and the overlay 3 for processing.

According to the media data transmission method provided in this embodiment of this application, the MPD file includes the decoding capability requirement indication information of the overlay, and the client can determine, based on the decoding capability of the client and a decoding capability requirement that is of the overlay and that is indicated by the decoding capability requirement indication information, whether to process the overlay.

The foregoing describes the solutions provided in the embodiments of this application mainly from a perspective of interaction between the server and the client. It may be understood that, to implement the foregoing functions, the server and the client include corresponding hardware structures and/or software modules for implementing the functions. A person skilled in the art should be easily aware that units and algorithm operations in the examples described with reference to the embodiments disclosed in this specification can be implemented in a form of hardware or a combination of hardware and computer software in this application. Whether a function is executed by hardware or hardware driven by computer software depends on particular applications and design constraints of the technical solutions. A person skilled in the art may use different methods to implement the described functions for each particular application, but it should not be considered that the embodiment goes beyond the scope of this application.

In the embodiments of this application, the server and the client may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, and is merely logical function division. In actual embodiment, another division manner may be used. An example in which each functional module is obtained through division based on each corresponding function is used below for description.

Figure 5:
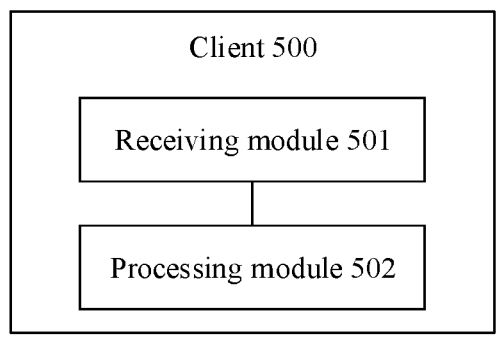
FIG. 5 is a schematic block diagram 1 of a client according to an embodiment of this application.

FIG. 5 is a schematic block diagram of a client 500 according to an embodiment of this application. The client 500 includes the following modules.

A receiving module 501 is configured to receive a media presentation description MPD file, where the MPD file includes priority indication information, and the priority indication information is used to indicate a priority or priorities of one or more overlays.

A processing module 502 is configured to process the one or more overlays based on the priority indication information.

In an embodiment, the processing module 502 is configured to: when a processing resource of the client is insufficient, process, based on a quantity of overlays that can be processed by using the processing resource of the client, the quantity of overlays in descending order of the priority or priorities of the one or more overlays.

In an embodiment, the priority indication information is attribute information of an overlay descriptor in the MPD file.

In an embodiment, the attribute information of the overlay descriptor further includes an identifier of the overlay.

In an embodiment, the priority indication information includes one priority value, and the one priority value is used to indicate the priority or priorities of the one or more overlays.

In an embodiment, the one or more overlays are M overlays, the priority indication information includes M priority values, the M priority values are used to indicate priorities of the M overlays, and M is a positive integer.

In an embodiment, an $n^{th}$ value in the M priority values is used to indicate a priority of an $n^{th}$ overlay in the M overlays, and n is a positive integer less than or equal to M.

In an embodiment, the overlay descriptor is located in an adaptation set of the MPD file.

It should be understood that, in this embodiment of this application, the processing module 502 may be implemented by a processor or a processor-related circuit component, and the receiving module 501 may be implemented by a transceiver or a transceiver-related circuit component.

Figure 6:
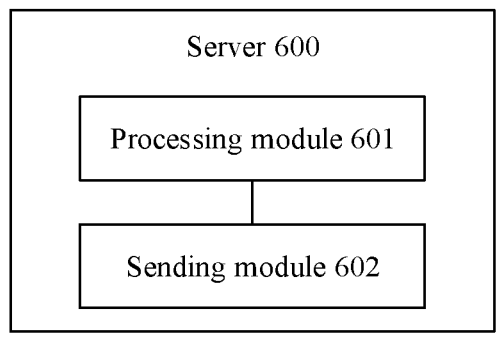
FIG. 6 is a schematic block diagram 1 of a server according to an embodiment of this application.

FIG. 6 is a schematic block diagram of a server 600 according to an embodiment of this application. The server 600 includes the following modules.

A processing module 601 is configured to determine a priority or priorities of one or more overlays.

A sending module 602 is configured to send an MPD file, where the MPD file includes priority indication information, and the priority indication information is used to indicate the priority or priorities of the one or more overlays.

In an embodiment, the priority indication information is attribute information of an overlay descriptor or overlay descriptors of the one or more overlays in the MPD file.

In an embodiment, the attribute information of the overlay descriptor further includes an identifier or identifiers of the one or more overlays.

In an embodiment, the priority indication information includes one priority value, and the one priority value is used to indicate the priority or priorities of the one or more overlays.

In an embodiment, the one or more overlays are M overlays, the priority indication information includes M priority values, the M priority values are used to indicate priorities of the M overlays, and M is a positive integer.

It should be understood that, in this embodiment of this application, the processing module 601 may be implemented by a processor or a processor-related circuit component, and the sending module 602 may be implemented by a transceiver or a transceiver-related circuit component.

Figure 7:
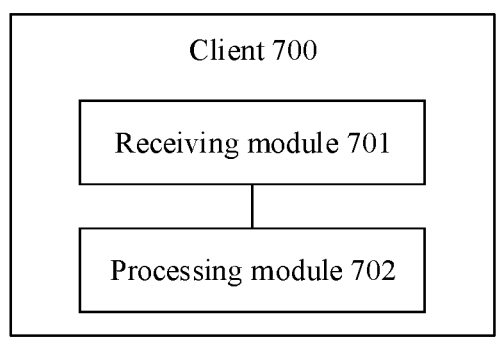
FIG. 7 is a schematic block diagram 2 of a client according to an embodiment of this application.

FIG. 7 is a schematic block diagram of a client 700 according to an embodiment of this application. The client 700 includes the following modules.

A receiving module 701 is configured to receive an MPD file, where the MPD file includes decoding capability requirement indication information of an overlay, and the decoding capability requirement indication information is used to indicate a requirement on a decoding capability required for decoding the overlay.

A processing module 702 is configured to process the overlay based on the decoding capability requirement indication information of the overlay.

The required decoding capability includes an image resolution that needs to be supported.

In an embodiment, the decoding capability requirement indication information includes decoding capability width requirement indication information and decoding capability height requirement indication information; the decoding capability width requirement indication information is used to indicate the width of the image resolution that needs to be supported to decode the overlay, and the decoding capability height requirement indication information is used to indicate the height of the image resolution that needs to be supported to decode the overlay; and the image resolution that needs to be supported is a product of the width of the image resolution that needs to be supported and the height of the image resolution that needs to be supported.

In an embodiment, the decoding capability requirement indication information of the overlay is attribute information of an overlay descriptor of the overlay in the MPD file.

In an embodiment, the attribute information of the overlay descriptor further includes an identifier of the overlay.

In an embodiment, the overlay descriptor is located in an adaptation set of the MPD file.

In an embodiment, the overlay includes one or more overlays. The processing module 702 is configured to process the overlay if a decoding capability of the client is greater than a sum of a decoding capability requirement or decoding capability requirements indicated by the decoding capability requirement indication information of the one or more overlays.

In an embodiment, the MPD file includes priority indication information, and the priority indication information is used to indicate a priority or priorities of the one or more overlays. The processing module 702 is configured to: if the decoding capability of the client is less than the sum of the decoding capability requirement or decoding capability requirements indicated by the decoding capability requirement indication information of the one or more overlays, select, based on the priority or priorities of the one or more overlays, an overlay that is to be preferentially processed, for processing. The decoding capability of the client is greater than or equal to a sum of a decoding capability requirement indicated by decoding capability requirement indication information of the overlay that is to be preferentially processed.

It should be understood that, in this embodiment of this application, the processing module 702 may be implemented by a processor or a processor-related circuit component, and the receiving module 701 may be implemented by a transceiver or a transceiver-related circuit component.

Figure 8:
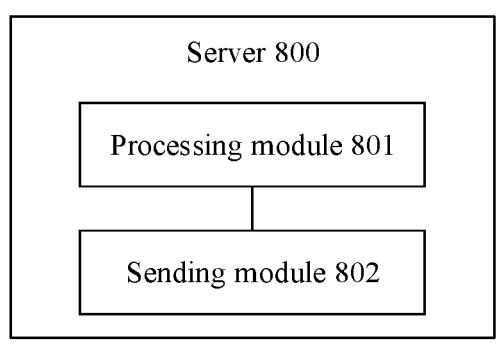
FIG. 8 is a schematic block diagram 2 of a server according to an embodiment of this application.

FIG. 8 is a schematic block diagram of a server 800 according to an embodiment of this application. The server 800 includes the following modules.

A processing module 801 is configured to determine a decoding capability requirement of an overlay.

A sending module 802 is configured to send an MPD file, where the MPD file includes decoding capability requirement indication information of the overlay, and the decoding capability requirement indication information is used to indicate a requirement on a decoding capability required for decoding the overlay.

The required decoding capability includes an image resolution that needs to be supported.

In an embodiment, the decoding capability requirement indication information includes decoding capability width requirement indication information and decoding capability height requirement indication information; the decoding capability width requirement indication information is used to indicate the width of the image resolution that needs to be supported to decode the overlay, and the decoding capability height requirement indication information is used to indicate the height of the image resolution that needs to be supported to decode the overlay; and the image resolution that needs to be supported is a product of the width of the image resolution that needs to be supported and the height of the image resolution that needs to be supported.

In an embodiment, the decoding capability requirement indication information of the overlay is attribute information of an overlay descriptor of the overlay in the MPD file.

In an embodiment, the attribute information of the overlay descriptor further includes an identifier of the overlay.

It should be understood that, in this embodiment of this application, the processing module 801 may be implemented by a processor or a processor-related circuit component, and the sending module 802 may be implemented by a transceiver or a transceiver-related circuit component.

Figure 9:
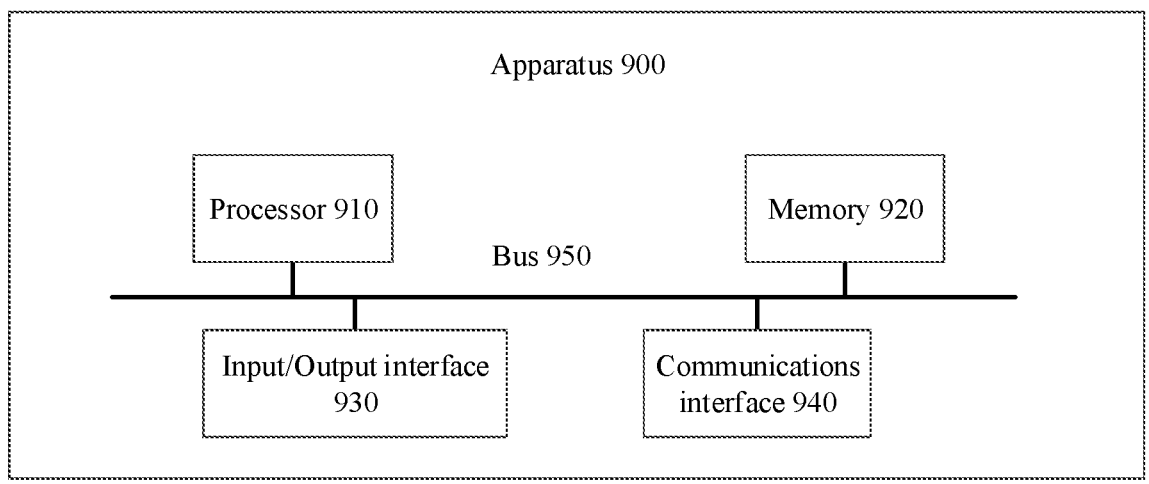
FIG. 9 is a schematic structural diagram of hardware of a media data transmission apparatus according to an embodiment of this application.

FIG. 9 is a schematic structural diagram of hardware of a media data transmission apparatus according to an embodiment of this application. The apparatus 900 shown in FIG. 9 may be considered as a computer device. The apparatus 900 may be used as an embodiment of the client 500, the server 600, the client 700, or the server 800 in the embodiments of this application, or may be used as an embodiment of the media data transmission method in the embodiments of this application. The apparatus 900 includes a processor 910, a memory 920, an input/output interface 930, and a bus 950, and may further include a communications interface 940. The processor 910, the memory 920, the input/output interface 930, and the communications interface 940 are communicatively connected to each other through the bus 950.

The processor 910 may be a general-purpose central processing unit (CPU), a microprocessor, an application-specific integrated circuit (ASIC), or one or more integrated circuits. The processor 910 is configured to execute a related program to implement functions that need to be executed by the modules in the client or the server in the embodiments of this application, or to perform the media data transmission method in the method embodiments of this application. The processor 910 may be an integrated circuit chip and has a signal processing capability. In an embodiment process, operations in the foregoing methods can be implemented by a hardware integrated logical circuit in the processor 910 or by using instructions in a form of software. The processor 910 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 910 may implement or perform the methods, the operations, and logical block diagrams that are disclosed in the embodiments of this application. The general-purpose processor may be a microprocessor, or the processor may be any conventional processor or the like. Operations of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 920. The processor 910 reads information in the memory 920, and implements, in combination with hardware of the processor 910, the functions that need to be executed by the modules that are included in the client or the server in the embodiments of this application, or performs the media data transmission method in the method embodiments of this application.

The memory 920 may be a read-only memory (ROM), a static storage device, a dynamic storage device, or a random access memory (RAM). The memory 920 may store an operating system and another application program. When the functions that need to be executed by the modules that are included in the client or the server in the embodiments of this application are implemented or the media data transmission method in the method embodiments of this application is performed by using software or firmware, program code used to implement the technical solutions provided in the embodiments of this application is stored in the memory 920, and the processor 910 performs operations that need to be performed by the modules that are included in the client or the server, or performs the media data transmission method provided in the method embodiments of this application.

The input/output interface 930 is configured to receive input data and information, and output data such as an operation result.

The communications interface 940 implements communication between the apparatus 900 and another device or a communications network by using a transceiver apparatus such as, but not limited to, a transceiver. The communications interface 940 may be used as an obtaining module or a sending module in a processing apparatus.

The bus 950 may include a path, for transmitting information between the components (for example, the processor 910, the memory 920, the input/output interface 930, and the communications interface 940) of the apparatus 900.

It should be noted that, although only the processor 910, the memory 920, the input and output interface 930, the communications interface 940, and the bus 950 of the apparatus 900 are shown in FIG. 9, in a specific embodiment process, a person skilled in the art should understand that the apparatus 900 further includes another device required for implementing normal running, for example, may further include a display that is configured to display to-be-played video data. In addition, based on a specific requirement, a person skilled in the art should understand that the apparatus 900 may further include hardware components for implementing other additional functions. In addition, a person skilled in the art should understand that the apparatus 900 may alternatively include only components required for implementing this embodiment of this application, but not necessarily include all the components shown in FIG. 9.

A person of ordinary skill in the art may be aware that, in combination with the examples described in the embodiments disclosed in this specification, units and algorithm operations may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

For technical effects of any one of the foregoing devices or apparatuses, refer to technical effects of the corresponding method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A media data transmission method, comprising:
receiving, by a client, a media presentation description (MPD) file, wherein the MPD file comprises priority indication information used to indicate a priority of each of one or more overlays of an omnidirectional video, and decoding capability requirement indication information for each of the one or more overlays used to indicate a resource required for decoding the overlay as indicated by the decoding capability requirement indication information;
determining, by the client, that a decoding capability of the client is less than a sum of resources required for decoding the one or more overlays;
obtaining, by the client, bitstream data of a quantity of overlays based on the decoding capability of the client in a descending order of priorities of the quantity of overlays from a server; and
decoding, by the client, the one or more overlays based on the priority indication information.

2. The method according to claim 1, wherein the priority indication information is attribute information of an overlay descriptor in the MPD file.

3. The method according to claim 2, wherein
the attribute information of the overlay descriptor further comprises one or more identifiers of the one or more overlays.

4. The method according to claim 1, wherein the priority indication information comprises a single priority value to indicate the one or more priorities of the one or more overlays.

5. The method according to claim 1, wherein the one or more overlays include M overlays, the priority indication information comprises M priority values to indicate priorities of the M overlays, and M is a positive integer.

6. The method according to claim 5, wherein an $n^{th}$ value in the M priority values is used to indicate a priority of an $n^{th}$ overlay in the M overlays, and n is a positive integer less than or equal to M.

7. A client, comprising:
a processor;
a memory coupled to the processor and storing program instructions, which, when executed, cause the processor to:
receive a media presentation description (MPD) file, wherein the MPD file comprises priority indication information used to indicate a priority of each of one or more overlays of an omnidirectional video, and decoding capability requirement indication information for each of the one or more overlays used to indicate a resource required for decoding the overlay as indicated by the decoding capability requirement indication information;
determine a decoding capability of the client is less than a sum of resources required for decoding the one or more overlays;
bitstream data of a quantity of overlays based on the decoding capability of the client in a descending order of priorities of the quantity of overlays from a server; and
decoding the one or more overlays based on the priority indication information.

8. The client according to claim 7, wherein the priority indication information is attribute information of an overlay descriptor in the MPD file.

9. The client according to claim 8, wherein
the attribute information of the overlay descriptor further comprises one or more identifiers of the one or more overlays.

10. The client according to claim 7, wherein the priority indication information comprises a single priority value to indicate the one or more priorities of the one or more overlays.

11. The client according to claim 7, wherein the one or more overlays include M overlays, the priority indication information comprises M priority values used to indicate priorities of the M overlays, and M is a positive integer.

12. The client according to claim 11, wherein an $n^{th}$ value in the M priority values is used to indicate a priority of an $n^{th}$ overlay in the M overlays, and n is a positive integer less than or equal to M.

13. A non-transitory machine-readable medium having instructions stored therein, which instructions, when executed by a processor, cause the processor to perform operations for handling sensor failures in an autonomous driving vehicle (ADV), the operations comprising:
receiving, by a client, a media presentation description (MPD) file, wherein the MPD file comprises priority indication information used to indicate a priority of each of one or more overlays of an omnidirectional video, and decoding capability requirement indication information for each of the one or more overlays used to indicate a resource required for decoding the overlay as indicated by the decoding capability requirement indication information;
determining, by the client, that a decoding capability of the client is less than a sum of resources required for decoding the one or more overlays;
obtaining, by the client, bitstream data of a quantity of overlays based on the decoding capability of the client in a descending order of priorities of the quantity of overlays from a server; and
decoding, by the client, the one or more overlays based on the priority indication information.

14. A non-transitory machine-readable medium according to claim 13, wherein the priority indication information is attribute information of an overlay descriptor in the MPD file.

15. A non-transitory machine-readable medium according to claim 14, wherein
the attribute information of the overlay descriptor further comprises one or more identifiers of the one or more overlays.

16. A non-transitory machine-readable medium according to claim 13, wherein the priority indication information comprises a single priority value to indicate the one or more priorities of the one or more overlays.

17. A non-transitory machine-readable medium according to claim 13, wherein the one or more overlays include M overlays, the priority indication information comprises M priority values to indicate priorities of the M overlays, and M is a positive integer.

18. A non-transitory machine-readable medium according to claim 17, wherein an $nt^h$ value in the M priority values is used to indicate a priority of an $n^{th}$ overlay in the M overlays, and n is a positive integer less than or equal to M.

* * * * *